3,294,804
1-(3-HYDROXY-3-PHENYLPROPYL)-4-PHENYL-4-PROPIONOXY-PIPERIDINE

Philip M. Carabateas, Schodack, N.Y., assignor to Sterling Drug Inc., New York, N.Y., a corporation of Delaware
No Drawing. Filed Jan. 27, 1961, Ser. No. 85,195
1 Claim. (Cl. 260—294.3)

This invention relates to compositions of matter known in the art of chemistry as substituted-piperidines and to a process for making such compositions.

Piperidines having a wide variety of aryl and lower-acyloxy or lower-carbalkoxy substituents attached to the 4-position carbon atom of the piperidine ring are known in the art. Such substituted-piperidines are also known in which one or more lower-aliphatic hydrocarbon radicals are attached to other carbon atoms of the piperidine ring. Piperidines so substituted are known having various radicals attached to the nitrogen atom of the piperidine ring, such as lower-alkyl, aralkyl, aralkenyl, aryloxyalkyl, and arylmercaptoalkyl. Recently published are 4-aryl-4-(lower-carbalkoxy)-piperidines having 3-hydroxy-3-phenylpropyl and 3-acyloxy-3-phenylpropyl radicals attached to the nitrogen atom of the piperidine ring. Also known are 4-aryl-4-(lower-acyloxyl)-piperidines having 3-acyloxy-3-phenylpropyl radicals attached to the nitrogen atom of the piperidine ring.

It is an object of the present invention to provide useful compositions of the aforesaid class of substituted-piperidines having a novel combination of substituents attached to the 1- and the 4-positions of the piperidine ring.

The invention, in its composition aspect, is described as residing in the concept of a composition having a molecular structure in which a 3-aryl-3-hydroxypropyl substituent is attached to the nitrogen atom or 1-position of 4-acyloxy-4-aryl-piperidines.

In its process aspect the invention is described as residing in the concept of reacting a 4-acyloxy-4-aryl-1-(3-aryl-3-oxopropyl)piperidine with a reducing agent to obtain the corresponding 1-(3-aryl-3-hydroxypropyl)-piperidine. The reaction is carried out using an alkali metal borohydride as the reducing agent in a suitable solvent, e.g., a lower-alkanol or in a mixture of a lower-alkanol and water. The reaction can be conducted at room temperature.

The physical embodiments of the invention are white, crystalline solids, slightly soluble in water in the form of acid-addition salts and soluble in ethyl alcohol. They possess the inherent applied use characteristics of exerting a very high analgesic effect in animal organisms, as evidenced by pharmacological evaluation in rats according to standard test procedures.

The foregoing is a general description of the manner and process of making and using the invention so as to enable any persons skilled in the art of chemistry to make and use the same.

The molecular structures of the compounds of the invention are established by their mode of synthesis and corroborated by the correspondence of calculated and found values for the elementary analysis for representative examples.

The best mode contemplated by the inventor of carrying out his invention will now be set forth as follows:

Dissolve 8.5 g. of 1-(3-oxo-3-phenylpropyl)-4-phenyl-4-propionoxypiperidine in 100 cc. of methanol. Add to the methanol solution 1 g. of sodium borohydride and stir the resulting solution for 2 hours. Concentrate the reaction mixture to a semi-solid and pour this into water. Extract the aqueous mixture with ether and then wash the ether extract with water and distill off the ether solvent. To dry the remaining oil, add benzene and remove it by distilling in vacuo. Dissolve the oil in ether and to this solution add a solution of hydrogen chloride in ether. Boil the resulting gummy precipitate with ethyl acetate to obtain a solid. Recrystallize the solid once from propionitrile and once from acetone to obtain 3.4 g. (36.1%) of the white crystalline product, 1-(3-hydroxy-3-phenylpropyl)-4-phenyl-4-propionoxypiperidine in the form of its hydrochloride salt, M.P. 174.0–175.4° C. (corr).

*Analysis.*—Calcd. for $C_{23}H_{29}NO_3 \cdot HCl$: C, 68.39; H, 7.49; Cl, 8.78. Found: C, 68.75; H, 7.44; Cl, 8.82.

To prepare 1-(3-hydroxy-3-phenylpropyl)-4-phenyl-4-propionoxypiperidine in free base form, dissolve the hydrochloride in water, treat the solution with aqueous sodium hydroxide solution, extract the alkaline solution with benzene, dry the benzene extract over anhydrous sodium sulfate and remove the benzene by distilling in vacuo.

Pharmacological evaluation of 1-(3-hydroxy-3-phenylpropyl)-4-phenyl-4-propionoxypiperidine hydrochloride in aqueous solution administered to rats subcutaneously using the D'Amour-Smith method has shown that this compound is about thirty-two hundred and twenty times as potent an analgesic as meperidine hydrochloride on a molar basis in terms of the bases.

The above intermediate 1-(3-oxo-3-phenylpropyl)-4-phenyl-4-propionoxypiperidine is disclosed and claimed in my copending U.S. patent application, S.N. 860,368, filed December 18, 1959. The preparation of this compound, disclosed in said U.S. application, is given in two steps as follows: Place 19.5 g. of N-(3-oxo-3-phenylpropyl)-N,N,N,-trimethylammonium iodide, 10.6 g. of 4-phenyl-4-piperidinol, 12.7 g. of anhydrous sodium carbonate and 100 cc. of dimethylformamide in a reactor provided with a stirrer. Stir the reaction mixture at room temperature (about 25° C.) for about three hours and at the same time pass a slow stream of nitrogen into the stirred mixture. Trimethylamine is given off rapidly during the first thirty minutes, and slowly thereafter. Pour the reaction mixture into one liter of water. Collect the resulting white precipitate, wash it with water, allow it to air-dry at room temperature and recrystallize it from benzene-cyclohexane. This product, 1-(3-oxo-3-phenylpropyl)-4-phenyl-4-piperidinol melts at 132.4–134.8° C. (corr.) and is obtained in about a 80% yield.

*Analysis.*—Calcd. for $C_{20}H_{23}NO_2$: C, 77.61; H, 7.49; N, 4.53. Found: C. 77.36; H, 7.25; N, 4.52.

Suspend a small quantity of 1-(3-oxo-3-phenylpropyl)-4-phenyl-4-piperidinol in ethanol; add thereto a solution of hydrogen chloride in ethanol followed by ether; and allow the resulting solution to stand. Collect the crystalline hydrochloride salt which separates and recrystallize it from ethanol to yield the purified 1-(3-oxo-3-phenylpropyl)-4-phenyl-4-piperidinol hydrochloride M.P. 189.5–191° C.

Reflux a mixture containing 6.0 g. of 1-(3-oxo-3-phenylpropyl)-4-phenyl-4-piperidinol hydrochloride and 50 cc. of propionic anhydride until all the solid hydrochloride dissolves. Continue heating the reaction mixture on a steam bath overnight. Concentrate the reaction mixture in vacuo and triturate the resulting viscous oily material with ether to yield a semi-solid. Recrystallize this mixture first from ethyl acetate and then from acetone, using decolorizing charcoal with acetone, to yield about 1.7 g. (24.4% yield) of the product, 1-(3-oxo-3-phenylpropyl)-4-phenyl-4-propionoxypiperidine hydrochloride, M.P. 147.6–152.8° C. (corr.).

*Analysis.*—Calcd. for $C_{23}H_{27}NO_3 \cdot HCl$: C, 68.73; H, 7.02; Cl, 8.82. Found: C, 68.39; H, 7.14; Cl, 9.10.

To prepare this product in its free base form, dissolve the hydrochloride salt in water, treat the solution with aqueous sodium hydroxide solution, extract the liberated basic product with benzene, dry the benzene extract over anhydrous sodium sulfate, and remove the benzene by distilling in vacuo.

The foregoing description of the invention is for purposes of illustration and does not limit the generality of the applicability of the inventive concept as herein set forth. Other 1-(3-aryl-3-hydroxypropyl)-4-aryl-4-(lower-acyloxy)piperidines and their acid addition salts can be prepared in the manners above-described by substituting the molar equivalent quantities of the desired 1-(3-aryl-3-oxopropyl)-4-aryl-4-(lower-acyloxy)piperidine and alkali metal borohydride for the corresponding reactants in the above example and are regarded by the applicant as the full equivalents of the particular embodiments of the invention herein specifically described and claimed.

I claim:
1 - (3 - hydroxy - 3 - phenylpropyl) - 4 - phenyl - 4-propionoxypiperidine.

References Cited by the Examiner
UNITED STATES PATENTS

| | | | |
|---|---|---|---|
| 2,846,437 | 8/1958 | Elpern | 260—294.3 |
| 2,850,500 | 9/1958 | Elpern | 260—294.3 |
| 2,904,550 | 9/1959 | Pohland | 260—294.3 |
| 2,951,080 | 8/1960 | Pohland | 260—294.3 |
| 2,962,501 | 11/1960 | Cutler et al. | 260—294.3 |

ALEX MAZEL, *Primary Examiner.*

IRVING MARCUS, J. TOVAR, *Assistant Examiners.*